(No Model.)
S. D. FORBES.
SPOKE SOCKET.
No. 466,990. Patented Jan. 12, 1892.
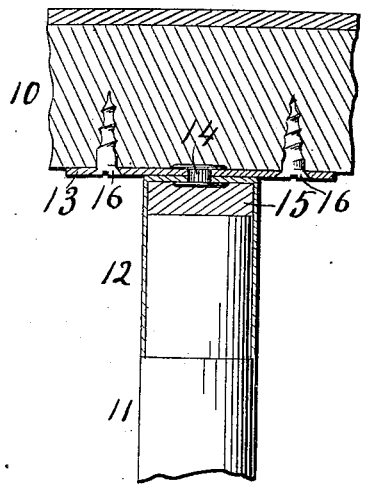
Fig I.
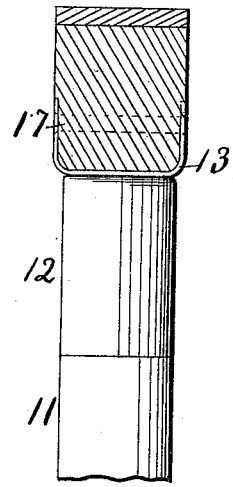
Fig II.
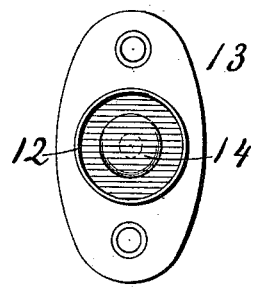
Fig III.
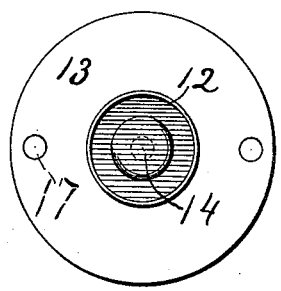
Fig IV.
WITNESSES,
P. E. Stevens
M. C. Hillyard
INVENTOR.
Samuel D. Forbes.
By W. K. Stevens. ATTY.

UNITED STATES PATENT OFFICE.

SAMUEL D. FORBES, OF WILMINGTON, DELAWARE.

SPOKE-SOCKET.

SPECIFICATION forming part of Letters Patent No. 466,990, dated January 12, 1892.

Application filed June 27, 1891. Serial No. 397,714. (No model.)

*To all whom it may concern:*

Be it known that I, SAMUEL D. FORBES, a citizen of the United States, residing at Wilmington, in the county of New Castle and State of Delaware, have invented certain new and useful Improvements in Spoke-Sockets; and I do hereby declare the following to be a full, clear, and exact description of the invention, such as will enable others skilled in the art to which it appertains to make and use the same.

This invention relates to spoke-sockets, which are used for connecting the ends of the spokes with the felly of a wheel; and the object of the invention is to provide a very light and very strong socket of neat appearance adapted to connect the end of a spoke having no tenon with the felly, by the aid of which socket any person of ordinary skill in the use of tools may readily repair a wheel when the spoke becomes broken at or near the shoulder of the tenon.

To this end my invention consists in the construction and combination of parts forming a spoke-socket hereinafter described and claimed, reference being had to the accompanying drawings, in which—

Figure I is a central vertical section of a portion of a spoke and felly of a wheel with my spoke-socket joining them. Fig. II is a cross-section of felly, showing my spoke-socket in elevation. Fig. III is an under side view of my spoke-socket, and Fig. IV is an under side view of modification of the same.

10 represents a portion of the felly of a wheel.

11 represents a portion of a spoke of a wheel, which may be originally made without a tenon to project into the felly, or it may be a spoke whose tenon has been broken off.

12 represents a thimble or cap swaged into form from sheet metal, preferably steel.

13 represents a washer, which is also made of thin sheet-steel and is secured to the top of the thimble 12 by means of the rivet 14.

15 represents a packing-piece consisting of hard wood, leather, or any other suitable material and used for the purpose of lengthening the spoke a very little in case a portion of it has to be cut off to true up a rough broken end.

The washer 13 may be either round, as shown in Fig. IV, or elongated, as shown in Fig. III, and it may be fastened to the felly by means of screws 16, entering the under side of the felly; or it may be bent up at the sides of the felly and secured thereto by means of horizontal screws or by a rivet 17. The method of securing this washer to the felly is not essential to my invention; but it is essential that the washer and thimble be made into two separate pieces and fastened together in order that the thimble may be made of material which may be swaged into shape with a whole head to support the end of the spoke. A casting comprising the thimble and the washer in one piece would not be my invention, because I find it impracticable to cast these parts so thin and light and strong as they may be made of sheet metal, and lightness and strength, as well as the neatness of appearance, which can only be attained by using very thin metal for this purpose, are all great considerations in the question of repairing nice carriage-wheels.

The thimble 12 need not be tapering at all; but I find that it gives a good appearance and is more easily fitted firmly upon the spoke if it has a taper of about one thirty-second of an inch to an inch in length.

The packing 15 is not positively necessary to my invention, and yet I find it a great convenience in giving the exact length required to the spoke in order to round up the wheel after the end of a spoke has been broken off.

Having thus fully described my invention, what I believe to be new, and desire to secure by Letters Patent, is the following:

The combination, in spoke-sockets, of a thimble adapted to receive the end of a spoke and having a covered outer end or head for the spoke to rest upon and a separate washer rigidly attached to the outer end of the said thimble, substantially as described.

In testimony whereof I affix my signature in presence of two witnesses.

SAMUEL D. FORBES.

Witnesses:
J. JACKSON PEIRCE,
J. BAIL PEIRCE.